No. 770,100. PATENTED SEPT. 13, 1904.
L. NESEMANN.
CAMERA.
APPLICATION FILED FEB. 20, 1904.
NO MODEL. 3 SHEETS—SHEET 1.
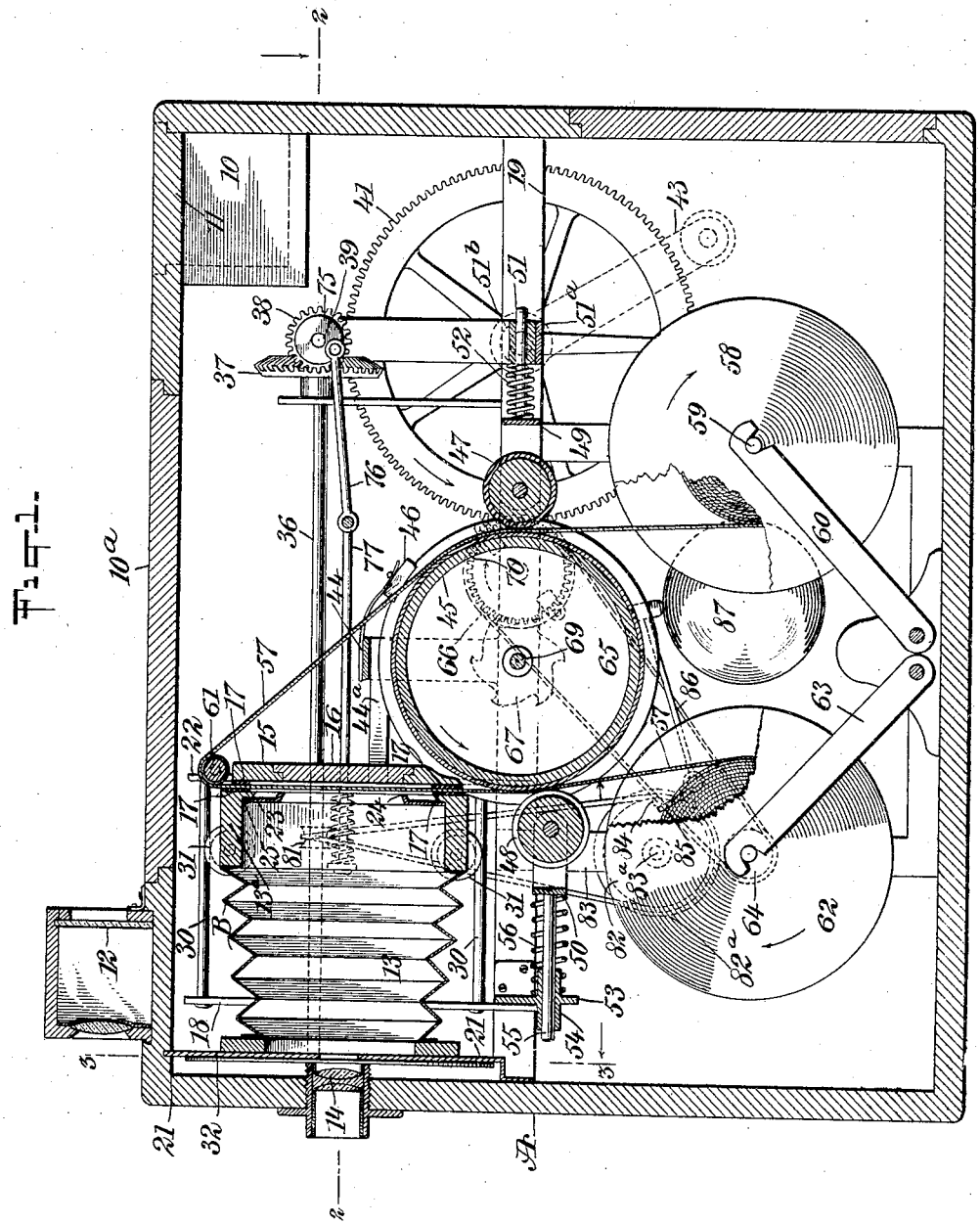
WITNESSES:
INVENTOR
Louis Nesemann
BY
ATTORNEYS

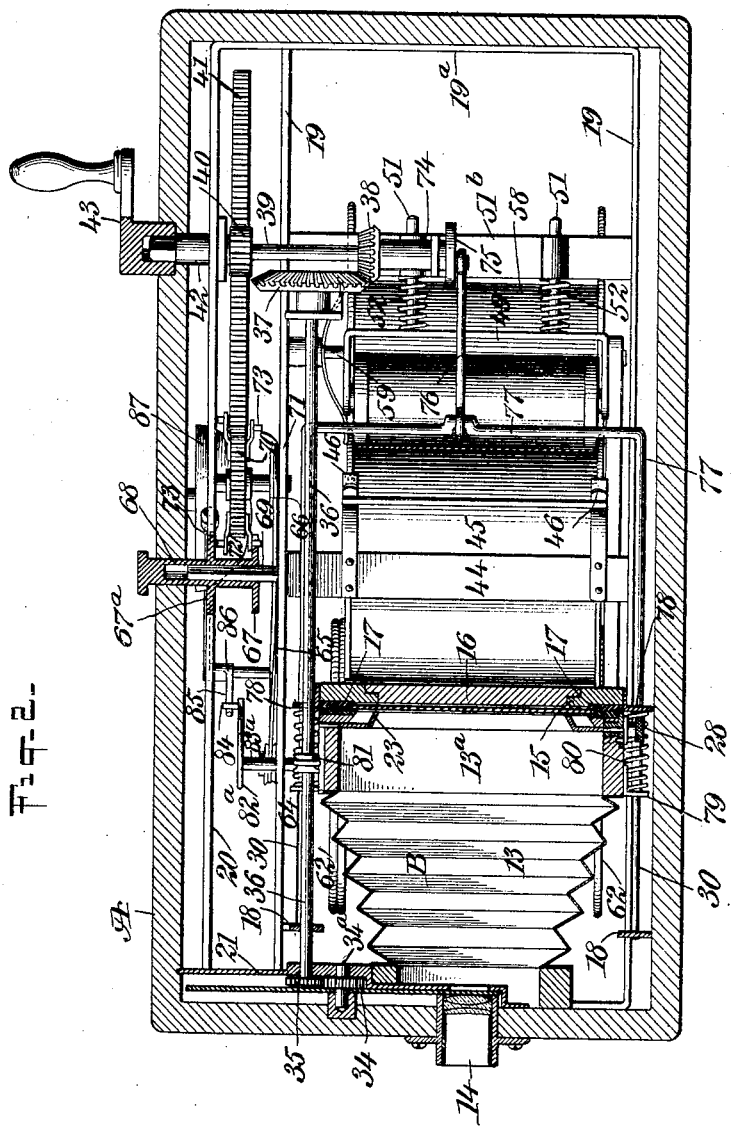

No. 770,100. PATENTED SEPT. 13, 1904.
L. NESEMANN.
CAMERA.
APPLICATION FILED FEB. 20, 1904.
NO MODEL. 3 SHEETS—SHEET 3.
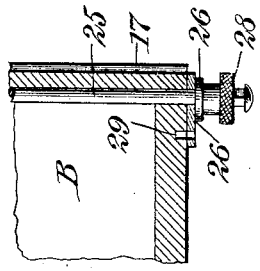
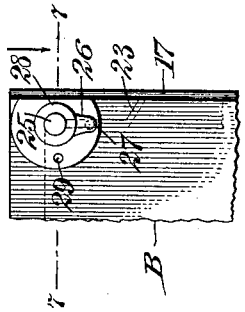
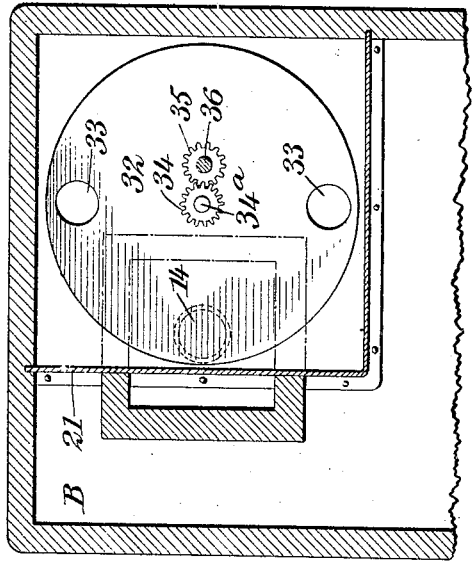
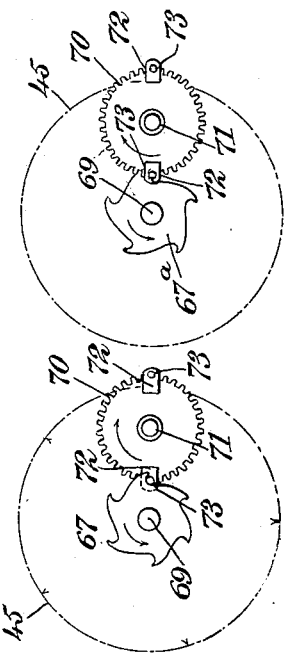
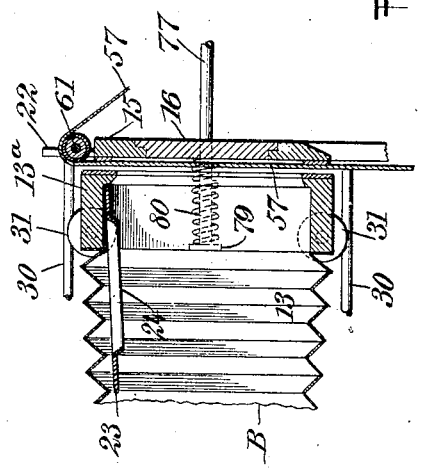
WITNESSES:
INVENTOR
Louis Nesemann
BY
ATTORNEYS No. 770,100.                                                    Patented September 13, 1904.

UNITED STATES PATENT OFFICE.

LOUIS NESEMANN, OF NEW YORK, N. Y.

CAMERA.

SPECIFICATION forming part of Letters Patent No. 770,100, dated September 13, 1904.

Application filed February 20, 1904. Serial No. 194,496. (No model.)

*To all whom it may concern:*

Be it known that I, LOUIS NESEMANN, a citizen of the United States, and a resident of the city of New York, borough of Manhattan, in the county and State of New York, have invented a new and Improved Camera, of which the following is a full, clear, and exact description.

The purpose of my invention is to provide a simple and effective form of camera in which accommodation is provided for a large reel of films and means for conducting the films past the rear of a camera-box in such manner that what is techically known as "moving pictures" may be taken or so that individual pictures may be taken at will.

Another purpose of the invention is to so construct a camera of the type mentioned that it will be compact, light, durable, and readily operated and so that the films may be easily and conveniently placed in position and removed and so that an alarm will be sounded after a predetermined number of pictures have been taken.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal vertical section through the lens apparatus and camera-box. Fig. 2 is a horizontal section taken practically on the line 2 2 of Fig. 1. Fig. 3 is a section taken substantially on the line 3 3 of Fig. 1. Fig. 4 is a longitudinal section taken through a portion of the bellows of the camera and the back thereof. Figs. 5 and 6 are detail views illustrating the main operative parts of the device for moving the film. Fig. 7 is a horizontal section through a portion of the camera proper, illustrating the mechanism employed for regulating the size of the portion of the film to be exposed, the section being taken practically on the line 7 7 of Fig. 8; and Fig. 8 is a side elevation of the outer rear portion of the camera proper, further illustrating the mechanism shown in Fig. 7.

A represents a camera-box, which may be of any desired size, and the said camera-box is preferably provided with a well 10 at what may be termed its "upper rear portion," and this well has a cover 11, fitted in the upper portion of the box, capable of being removed when desired. This well is adapted to receive a finder 12 when the camera is not in use, and when the camera is in use the finder 12 is readily removed from the well and is secured in any suitable or approved manner upon the upper portion of the camera box or casing. The upper portion of the said camera box or casing is also provided with a removable section $10^a$, whereby access may be gained to the interior of the box. It may be further noted that various other openings may be made in the sides or ends of the box, so that access may be had to the contents of the box for various purposes.

The camera proper, B, consists, as usual, of a bellows 13, provided at its rear portion with a frame $13^a$, of wood or other material, and the said bellows is provided with a lens 14, extending out through the forward portion of the box, as is shown in Figs. 1 and 2.

At the rear of the casing $13^a$ of the bellows 13 of the camera a fixed back 15 is located, and this back is secured in any suitable manner in the casing or box A by extending from side to side or being secured to any fixed supports connected with portions of the said box or casing. The back-board 15 of the camera proper, B, is preferably provided with an opening ordinarily closed by a cover 16, so that access may be gained at any time to the interior of the said camera B; and where the rear casing $13^a$ of the bellows 13 and the backboard 15 connect the two parts mentioned are provided with marginal packing 17, of felt, rubber, or a like material, as is best shown in Figs. 1 and 2.

At each side of the bellows 13 of the camera proper uprights 18 are located, extending from longitudinal bars 19, which bars 19 are carried from the front to the rear of the casing or box A, and the said bars at their rear ends are connected by a transverse member $19^a$. (Shown best in Fig. 2.) It may be here noted that at the right-hand side of the box or casing and at a predetermined distance from the right-hand rod or bar 19 a parallel rod or bar 20 is located, and these two rods or bars 19 and 20, which are clearly shown in Fig. 2, are connected with a vertical partition 21 at one side, preferably the right-hand side, of the bellows 13, and this partition is located as near as possible to the front portion of the box or casing A.

At each side of the camera proper, B, adjacent to the fixed back 15, uprights 22 are located, also supported by the longitudinal rods 19, and in order that the size of the film to be exposed may be regulated at will to a certain extent a size-regulator 23 in the form, for example, of a metal frame is employed, located within the main frame 13$^a$ of the camera proper, as illustrated in Figs. 1 and 4. This size-regulating frame 23 is provided with a flanged opening 24, and when the size-regulating frame 23 is in the vertical or operative position (shown in Fig. 1) the size of the picture to be taken is restricted, and the flanges at the opening 24 of the said size-regulating frame extend outward so as to be as near as possible to the film upon which the picture is to be taken, which film, as will be hereinafter described, passes down between the fixed back 15 of the camera proper and the frame 13$^a$ of the bellows 13. When a large picture is desired, the size-regulating frame 23 is carried up within the bellows 13 to the position shown in Fig. 4, thus permitting a picture to be taken which will be of a size corresponding to the size of the full opening at the rear of the bellows-section of the camera. This size-regulating frame is operated by means of a shaft 25, which is mounted to turn at the upper rear portion of the frame 13$^a$ at the rear of the bellows, and the said shaft 25 is likewise adapted to have end movement in the said frame 13$^a$. This shaft 25 is provided with a downwardly-extending finger 26 at its outer left-hand end, as is shown in Figs. 7 and 8, and the said finger 26 is provided with a stud 27, adapted to enter apertures 29, produced in a suitable plate at the left-hand side of the camera proper. When the finger 26 is in the lower vertical position, (shown in Figs. 7 and 8), the size-regulating frame 23 is in operative position, as is shown in Figs. 1 and 2, and the stud 27 on the finger 26 will then be entered in the lower aperture 29. When, however, a larger-sized picture is desired, the shaft 25 is first drawn outward so as to free the stud 27 from the aperture 29, in which it is entered, and then the shaft 25 is turned so as to bring the size-regulating frame 23 into the upper position (shown in Fig. 4) out of the field of the cone of light, and when such adjustment is made the shaft 25 is again forced inward, and the stud 27 on the finger 26 is made to enter the upper aperture 29.

The shaft 25 is operated through the medium of a milled wheel 28, which is located at its left-hand end, as is shown in Figs. 2, 7, and 8.

Tracks 30 are located above and below the bellows 13 of the camera proper, as is best shown in Fig. 1, which tracks extend from the forward standards 18 to the rear or inner standards 22, and preferably grooved guide-wheels 31 are mounted to turn upon the frame-section 13$^a$ of the bellows, and these grooved wheels engage with the said tracks 30, thus guiding the bellows 13 of the camera B and enabling the said bellows to operate freely to and from the lens, as at certain times it is necessary that the bellows-section of the camera shall move from the fixed back 15 and at other times move toward the said back, the details of which movements will be hereinafter particularly described.

The shutter 32 for the camera is provided with diagonally opposite openings 33, and the said shutter is secured upon a shaft 34$^a$, as is shown in Figs. 2 and 3, on which shaft at the rear of the shutter a pinion 34 is secured, which meshes with a second pinion 35, and this latter pinion is secured to a shaft 36, which extends rearward within the box or casing A, as is shown in Fig. 2. At the rear end of this shaft 36 a bevel-gear 37 is secured in any suitable or approved manner. This gear 37 meshes with a pinion 38, which is secured to a shaft 39, suitably mounted transversely at the rear portion of the box or casing, and the shaft 39, at what may be termed its "outer" end, carries a pinion 40, fast thereto. This pinion 40 meshes with a master-gear 41, and the said master-gear 41 is secured upon a short shaft 42, journaled in the rod or bar 20, and the shaft 42 extends out beyond right-hand side of the box or casing, as is shown in Fig. 2. The outer end of the shaft 42 is made polygonal in order to receive a detachable crank-hanger 43, by means of which the master-wheel 41 is turned, and thus motion is imparted to the shaft 39 and from the shaft 39 to the shutter 32.

It will be observed that two exposures are made at each revolution of the shutter, as two openings 33 are provided in the shutter, as is shown in Fig. 3.

An arch 44 extends from one of the longitudinal brace-bars 19 to the other in an upward direction at the rear of the camera proper, B, and arms 44$^a$ are carried from said arch to the back 15 of the camera proper to support the same. Just below the arch 44 a drum 45 is mounted to turn, being journaled in the said bars 19, as is shown in Fig. 1, and the said drum has flanges at its head portions and is provided with brake-shoes 46 in order to retard the motion of the film 57, which is to pass over this drum, as will be hereinafter set forth.

A feed-roller 47 is located at the rear of the drum 45, being adapted to engage with the film as it passes upward over the drum, and at the forward portion of the drum below the camera proper, B, a second feed-roller 48 is located, which likewise engages with the film as it passes down to its receiver or after the film has been exposed. The roller 47 is supported by a yoke 49, and the roller 48 is supported by a similar yoke 50, the yoke 49 facing in direction of the rear of the box or casing and the yoke 50 in direction of the front of the same. The yoke 49 of the rear feed-roller 47 is controlled and is supported by pins 51, attached to the transverse stretch of the yoke 49 and passed through suitable bearings 51$^a$ in cross-bars extending from one of the longitudinal bars 19 to the other, as is illustrated in Fig. 1, and springs 52 are coiled around the said pins 51, having engagement with the bearings 51$^a$ and with the transverse portion of the yoke 49.

With reference to the opposing feed-roller 48 its yoke 50 is supported by means of pins 55, attached to the transverse section of the yoke 50, which pins pass through bearings 54, supported by a suitable cross-bar extending from one longitudinal bar 19 to the other beneath the bellows 13 of the camera proper, B, as is best shown in Fig. 1.

Each pin 55 is encircled by a spring 56, having bearing against the bearings 54 and against the said yokes, so that the rollers 47 and 48 have tension-controlled bearings against the film as it passes around the drum 45.

The film 57, above alluded to, is initially coiled on a reel 58, the trunnions 59 of which are removably located in bearings in shifting-arms 60, as is shown in Fig. 1, and the said film after passing from the initial reel 58 is carried in engagement with the rear of the drum 45 and is then passed over a guide-roller 61, located above the fixed back portion 15 of the camera proper. The film is then passed down between the said fixed portion of the back of the camera proper and its bellows-section and is then carried between the drum 45 and the forward feed-roller 48 to an engagement with a receiving-reel 62, the trunnions of which are mounted to turn in bearings in suitable arms 63, capable of being shifted, so that both of the reels may be removed whenever necessary. The reel 58 is free to turn in its bearings and is revolved by the tension which is exerted on the film in a downward direction after it has been exposed at the camera; but the receiving-reel is operated through the medium of the crank-handle 43 and in the following manner: The right-hand trunnion 69 of the drum 45 is polygonal in cross-section and receives a sleeve 68, correspondingly bored, which sleeve extends out through the right-hand side of the camera-box and terminates in a suitable head, the said sleeve being adapted to be adjusted on the aforesaid trunnion 69. This sleeve carries two spur-wheels 67 and 67$^a$, one of the spur-wheels having a greater number of teeth than the other, and the teeth of the spur-wheels are more or less curved. For example, the teeth of the inner spur-wheel, 67, are six in number, as is shown in Fig. 5, and this spur-wheel is brought into action when the size-regulating frame 23 is in position at the rear of the camera proper, as is shown in Fig. 1. The other spur-wheel, 67$^a$, has, for example, five teeth, and this spur-wheel is brought into action when the size-regulating frame 23 is raised and the full opening is exposed at the rear of the camera proper, the latter spur-wheel being shown in Fig. 6. These spur-wheels regulate the rapidity of the feed of the film to the camera, the film moving slower when the size-regulating frame 23 is in action and faster when the said frame 23 is carried out of action. The spur-wheels 67 and 67$^a$ are operated through the medium of a pinion 70, which pinion is mounted to turn with an axle 71, which is extended outward from the right-hand longitudinal bar 19, as is shown in Fig. 2, and this pinion is provided with diagonally-opposite arms 72, which extend beyond its periphery, and from these arms 72 at each side studs 73 are horizontally projected, and the said studs are adapted to engage with the teeth of the said spur-wheel. The gear-wheel 70 meshes with the master-wheel 41 and receives movement therefrom and is twice the size of the pinion 40, likewise meshing with the master-wheel.

A small pulley 64 is secured, preferably, at the inner face of the receiving-reel 62, and a belt 65 is passed around the said pulley 64 and around a pulley 66, which is secured to a trunnion of the axle 71, carrying the pinion 70.

At the inner end of the hub of the pinion 38 a disk 75 is secured, to which disk a link 76 is eccentrically pivoted. This link 76 is pivotally connected with the transverse member of a yoke 77, as is shown in Fig. 2, and the side members of this yoke 77 pass loosely through guides 78, secured to the sides of the rear frame-section 13$^a$ of the camera proper, and at their forward ends are attached to brackets 79, secured to the forward side portions of the said frame 13$^a$, as is shown in Fig. 2. Springs 80 are coiled around the side members of the yoke 77, having bearing against the guides 78 and the brackets 79, the said springs being so arranged as to have a tendency to draw the bellows 13 of the camera proper forward or away from the fixed back 15; but in the operation of the shaft 39 the disk 75 and the link 76, acting on the yoke 77, tend in one position of the disk to draw the rear portion of the bellows as near as may be desirable to the fixed back 15 of the camera, it being understood that when a picture is taken and the film is to be wound on the receiving-reel 62 it is necessary that the bellows shall move from the fixed back to permit the film to pass freely downward, so as not to mar the surface that has been exposed; but when the exposure is to be made it is necessary that the back of the bellows shall be so close to the main back 15 of the camera proper as to hold the film firmly between these two parts to the exclusion of the light.

A pulley 81 is secured on the shaft 36 adjacent to the frame 13$^a$ of the bellows 13 of the camera proper, B, and a belt, preferably a crossed belt, is passed around this pulley 81, as is shown in Fig. 1, and around a second pulley 82 of larger size, which is mounted on a shaft 83$^a$, held to turn in a suitable bracket 83, extending downward from one of the longitudinal frame-bars 19, and on the same shaft a second pulley 82$^a$ is secured, which pulley is provided with a pin 84 near its periphery, adapted at a point in the revolution of the said pulley 82 to engage with a foot 85, which extends from a hammer 86, suitably fulcrumed in the box or casing A, as is shown in Fig. 1, which hammer is adapted to strike a gong 87, which is likewise suitably supported in the said box or casing, so that when the star-wheel, for example, has made one complete revolution and five or six exposures have been made after the last exposure has been effected the pin 84 will engage with the foot 85 of the hammer 86 and will raise the said hammer and immediately release it, so that the hammer will strike the gong in descending and notify the operator that a certain number of pictures have been taken.

I desire it to be understood that the alarm mechanism may be so arranged that it will not only indicate when a certain number of pictures have been taken but when the film has been exhausted from the supply-reel 58. This camera is exceedingly simple in its construction considering the objects sought to be obtained.

As the crank 43 is turned the shutter 32 is revolved, and while one of the apertures 33 in the shutter is being brought to registry with the lens the bellows of the camera proper is moved forward and the film is fed downward a suitable distance for an exposure, and just about when one of the apertures 35 in the shutter is brought in registry with the lens 14 the bellows is drawn backward by the action of the disk 75 and the link 76, and the film is then firmly held between the rear frame 13$^a$ of the bellows and the fixed back 15 of the camera. As soon as the exposure takes place, the handle 43 being continually turned, the bellows is again moved forward, and the film is fed downward and is wound upon the receiving-reel 62.

Having thus described my invention, I claim as new and desire to secure by Letters Patent—

1. A box or casing, a camera within the box or casing having a fixed back, a bellows terminating at the rear in a frame movable to and from the fixed back, mechanism for moving said frame to and fro at predetermined intervals, and film-feeding mechanism for automatically advancing a film between the bellows and the fixed back of the camera when the frame at the rear of the bellows is advanced.

2. A box or casing, a camera within the box or casing, a fixed back for the camera, a bellows for the camera, being movable to and from the fixed back, an operating mechanism for the bellows, a film passing between the bellows and the fixed back of the camera, a supply and a receiving reel for the film, means for feeding the film at intervals and automatically opening and closing the camera at its back respectively as the feed is in progress and when an exposure is to be made, an alarm device operated by the operative mechanism for the camera, and means for controlling the feed of the film, as set forth.

3. A box or casing, a camera within the same, the said camera having an adjustable bellows and a fixed back, tracks above and below the camera, and rollers carried by the bellows of the camera, engaging with the said tracks, as described.

4. A box or casing, a camera within the casing provided with an adjustable bellows, a fixed back, a track above and below the bellows, wheels carried by the bellows portion of the camera for engagement with the track, and a mechanism for alternately carrying the said bellows from the fixed back portion of the camera, and for returning the bellows to the said back, as set forth.

5. A box or casing, a camera within the said box or casing, a size-regulating frame located at the receiving end of the camera, and means for swinging the said size-regulating frame into and out of operation, as described.

6. A box or casing, a camera within the box or casing, having a fixed back and a bellows movable to and from the back, roller-guides for the bellows, a shutter having diametrically located exposure-openings therein, a master-wheel, means for operating the master-wheel from the outside of the camera, and a mechanism operated from the master-wheel for moving the shutter and moving the bellows from the fixed back of the camera, as and for the purpose described.

7. A box or casing, a camera within the same, provided with a fixed back, a bellows movable to and from the fixed back, a packing at the opposing faces of the bellows and the fixed back, the said two parts having a passage for a film, a roller-guide for the bellows, and an operating device accessible from the exterior of the box or casing, a shutter for the camera, a connection between the operating device and the shutter to move the latter, and a connection between the said operating device and the bellows to move the bellows from the back, the said bellows being spring-controlled in the return operation, a film, and a feed for the film, substantially as described.

8. A box or casing, a camera within the same, provided with a fixed back, a bellows movable to and from the fixed back, a packing at the opposing faces of the bellows and the fixed back, the said two parts having a passage for a film, a roller-guide for the bellows, an operating device accessible from the exterior of the box or casing, a shutter for the camera, a connection between the operating device and the shutter to move the latter, a connection between the said operating device and the bellows to move the bellows from the back, the said bellows being spring-controlled in the return operation, a film, a feed for the film, an alarm device, a brake mechanism for the feed, and means for controlling the movement of the alarm device and the feed from the aforesaid operative mechanism, as described.

In testimony whereof I have signed my name to this specification in the presence of two subscribing witnesses.

LOUIS NESEMANN.

Witnesses:
J. FRED. ACKER,
JNO. M. RITTER.